Aug. 21, 1923.
G. C. KELLEY
1,465,398
APPARATUS FOR PREPARING OIL FOR ELECTRIC TREATMENT
Filed Aug. 9, 1920
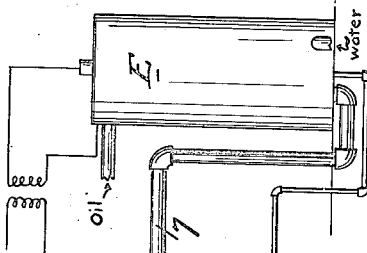
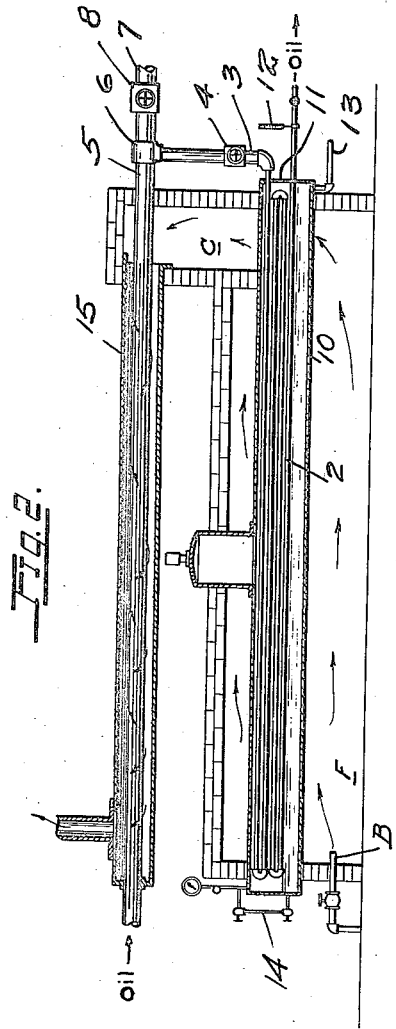
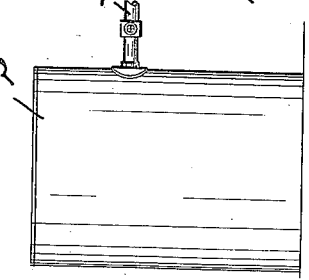
WITNESS
INVENTOR
Geo. C. Kelley.
BY
his ATTORNEYS.

Patented Aug. 21, 1923.

1,465,398

UNITED STATES PATENT OFFICE.

GEORGE C. KELLEY, OF TAFT, CALIFORNIA.

APPARATUS FOR PREPARING OIL FOR ELECTRIC TREATMENT.

Application filed August 9, 1920. Serial No. 402,467. REISSUED

*To all whom it may concern:*

Be it known that I, GEORGE C. KELLEY, a citizen of the United States, and a resident of Taft, county of Kern, State of California, have invented a new and useful Apparatus for Preparing Oil for Electric Treatment, of which the following is a specification.

This invention relates to an apparatus for the treating of the oils, generally directly from oil wells, to facilitate the separation of the water from the oil by reducing the viscosity of the oil.

In the drawing of oil from oil wells, it is found that there is usually present various proportions of emulsion and there is also present various proportions of water in suspension that it has been possible to separate out from the oil by various systems and apparatus. A common system and form of apparatus for aiding in the separation of the water consists in leading the oil from the well to a heating tank of considerable size and in which there is arranged a heating means, generally steam pipes, but it has been found that by that system the percentage of emulsion is greatly increased and which, therefore, requires additional time with unsatisfactory results for the breaking down of the emulsion.

It is one of the objects of the present invention to provide an improved apparatus for so heating the oil from wells or from storage tanks as to reduce its viscosity without increasing the emulsion in the oil.

A further object of the invention is to provide a system that is of economical cost of operation and high degree of efficiency in facilitating the separation of the water from the oil without increasing the emulsion and to provide an apparatus in which the oil is heated to a predetermined degree and in which there is a preliminary exchange of heat before the ultimate heating step.

A further object of the invention is to provide an improved apparatus for treating crude oil wherein the oil is heated while in a substantially confined passage, therefore presenting a comparatively small volume of the oil for a given period of time to the heating agent and, subsequently, subjecting the oil to an electrostatic field action in which the emulsion is broken up.

A further object is to provide an apparatus involving an elongated and, if desired, circuitous passage having diameters small as compared with the length of the passage and having means for heating and regulating the heat of the passage and, further, for the exchange of heat to the oil before it passes the passage.

The invention possesses other objects and features of advantage, some of which, with the foregoing, will be made manifest in the following description of the preferred form of the invention which is illustrated in the drawings accompanying and forming part of the specification. It is to be understood that it is not intended to limit the invention to the embodiment shown by the said drawings and description as variations may be adopted within the scope of the invention as set forth in the claims.

Referring to the drawings:

Fig. 1 is a diagrammatic and elevational view of the apparatus.

Fig. 2 is a longitudinal, vertical section and partial elevation of a heating apparatus and heat exchange means.

By the present invention, crude oil that may have been previously drawn from a well, or wells, into a storage tank, is directed into a heating apparatus in such manner that a column of oil of relatively small transverse area and of indeterminate length is caused to move in the presence of heat which latter is regulated preferably to a temperature less than the boiling point of water and which temperature is found most efficient when maintained at about 190° F. By this process and in the disclosed form of apparatus the viscosity of the crude oil is so materially reduced without increment in the proportion of emulsion which is, obviously, of great advantage as being economical both in time and expense of treatment of the oil to secure the final separation of water and breaking down of the emulsion.

The form of apparatus includes, in the illustrated embodiment, an elongated passage 2, shown as formed of piping having a transverse area with diameters small in comparison with the length of the passage and which passage is, in the present case, shown as circuitous and arranged to be heated by suitable means. One end of the passage 2 is connected to a branch pipe 3 in which is provided a valve 4 and which branch is connected to a feed pipe 5 of relatively large size as compared with the transverse area of the passage 2 and this feeder pipe 5 may be extended to any source of the supply for oil to be treated as, for instance, the storage tank S, Fig. 1.

The feeder pipe 5 may be extended from its connection 6 with the branch 3 as by means of a direct connection 7 in which connection there may be provided a cut-off valve 8 so that the flow of oil may be interrupted and directed to the branch 3 when the valve 4 is opened, so that the oil will be caused to flow through the comparatively constricted and elongated passage 2.

The passage 2 may be heated by any suitable means. There is shown a drum 10, into the end 11 of which the passage 2 is led and out of which it passes, the out-flowing oil portion of the passage being provided with a thermometer 12 to indicate the temperature of the oil. The drum 10 is provided with a water supply pipe and blow-off 13, shown as attached to the end 11, and the front end of the drum is provided with a water level gauge 14.

The drum is mounted in the illustrated form horizontally in a furnace F that may be heated by the combustion of oil at a burner or burners B adjacent the front end of the furnace and at the rear end of the latter there is provided a chimney C having a horizontally extending flue 15 encasing the feeder 5 so that there is a preliminary exchange of heat from the exhaust gases to the oil flowing through the feeder 5 to be subsequently directed into and heated in the passage 2.

The temperature of the oil discharging from the heater may be observed, by a reading of the thermometer 12, and closely regulated by the adjustment of the fuel supply, and the heated oil is then discharged into an electric dehydrating treater.

After the oil is heated it is directed from the pipe 2 into an apparatus known as an electrical treater E in which the oil is subjected to the action of an electrostatic field while it is, at the same time, agitated for the breaking down of the emulsion and the ultimate separation of the oil and water.

From the above, it will be seen that instead of directing the oil from the wells or storage tank into a heating chamber where a large volume of the oil is heated by direct contact with a steam or otherwise heated pipe, by the present process a preferably small volume of oil is presented to the heating agency the temperature of the oil being controlled to a nicety so as to avoid the generation of steam by the increment of the temperature of the water content to the degree necessary.

What is claimed is:

1. An apparatus for heating oil from wells to facilitate the separation of water, comprising a furnace, a hot water drum arranged horizontally in the furnace, an elongated oil passage arranged in the drum and through which oil is caused to flow to be heated, and a heat exchange flue leading from the furnace chimney and in which a preheater is arranged for heating the oil before it passes into the said passage.

2. An apparatus for heating oil from wells to facilitate the separation of water, comprising a furnace, a hot water drum in the furnace, an elongated oil passage arranged in the drum and through which oil is caused to flow to be heated in a small stream, a flue from the furnace, and a feeder leading through the flue to said passage to pre-heat the oil and being of greater transverse area than said passage.

In testimony whereof, I have hereunto set my hand.

GEORGE C. KELLEY.